(12) United States Patent
Saxena

(10) Patent No.: US 12,149,771 B2
(45) Date of Patent: *Nov. 19, 2024

(54) NON-TELEVISION EXPERIENCE TRIGGERS

(71) Applicant: ROKU, INC., San Jose, CA (US)

(72) Inventor: Samir Tiongson Saxena, Mountain View, CA (US)

(73) Assignee: Roku, Inc., San Jose, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 17/933,141

(22) Filed: Sep. 19, 2022

(65) Prior Publication Data

US 2023/0010754 A1    Jan. 12, 2023

Related U.S. Application Data

(63) Continuation of application No. 16/194,893, filed on Nov. 19, 2018, now Pat. No. 11,483,611.

(51) Int. Cl.
| | | |
|---|---|---|
| *H04N 21/41* | (2011.01) | |
| *H04N 21/43* | (2011.01) | |
| *H04N 21/435* | (2011.01) | |
| *H04N 21/436* | (2011.01) | |

(52) U.S. Cl.
CPC ... *H04N 21/4112* (2020.08); *H04N 21/43079* (2020.08); *H04N 21/435* (2013.01); *H04N 21/43615* (2013.01)

(58) Field of Classification Search
CPC ......... H04N 21/4112; H04N 21/43079; H04N 21/435; H04N 21/43615
See application file for complete search history.

(56) References Cited

U.S. PATENT DOCUMENTS

| 6,742,188 | B1 | 5/2004 | Del Castillo | |
| 11,483,611 | B2* | 10/2022 | Saxena | H04N 21/4131 |
| 2001/0036203 | A1 | 11/2001 | Yamaguchi et al. | |
| 2009/0197606 | A1* | 8/2009 | Bergman | H04W 36/38 |
| | | | | 370/331 |

(Continued)

OTHER PUBLICATIONS

International Search Report and Written Opinion of the International Searching Authority directed to related International Patent Application No. PCT/US2019/062131, mailed Mar. 20, 2020; 8 pages.

(Continued)

*Primary Examiner* — Ngoc K Vu
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for distributing content outside the confides of a television so as to enhance user experience of the content. An example media device embodiment operates according to a method that includes receiving a data stream containing content and at least one non-TV experience trigger; causing the content to be played on the TV; and providing the non-TV experience trigger to at least one appropriate accessory device in a manner synchronous with playing the content on the TV, to thereby extend playback of the content beyond the TV.

20 Claims, 7 Drawing Sheets

(56) References Cited

U.S. PATENT DOCUMENTS

| | | |
|---|---|---|
| 2013/0227410 A1* | 8/2013 | Sridhara .......... H04N 21/43615 |
| | | 715/702 |
| 2014/0267906 A1 | 9/2014 | Mickelsen et al. |
| 2014/0267911 A1 | 9/2014 | Grant et al. |
| 2017/0006334 A1 | 1/2017 | Beckett et al. |
| 2017/0033944 A1 | 2/2017 | Nadathur et al. |
| 2017/0064414 A1 | 3/2017 | Mickelson et al. |
| 2017/0150013 A1 | 5/2017 | LaCroix et al. |
| 2017/0251059 A1* | 8/2017 | Sawada ............... H04L 67/1095 |
| 2017/0257664 A1* | 9/2017 | Tam ................... H04N 21/6332 |
| 2017/0325129 A1 | 11/2017 | Zhu et al. |
| 2018/0158291 A1 | 6/2018 | Levesque et al. |
| 2018/0234726 A1 | 8/2018 | Allstead, Jr. et al. |
| 2019/0052475 A1 | 2/2019 | Dorrendorf et al. |

OTHER PUBLICATIONS

International Preliminary Report on Patentability directed to related International Patent Application No. PCT/US2019/062131, issued May 25, 2021; 6 pages.

* cited by examiner

NON-TELEVISION EXPERIENCE TRIGGERS

CROSS-REFERENCE TO RELATED APPLICATIONS

The present application is a continuation of U.S. Non-Provisional patent application Ser. No. 16/194,893, filed on Nov. 19, 2018, now U.S. Pat. No. 11,483,611 which is hereby incorporated by reference in its entirety.

BACKGROUND

Field

This disclosure is generally directed to playing content, and more particularly to distributing the content outside the confides of a television so as to enhance user experience of the content.

Background

Content, such as a movie or TV show, is typically displayed on a television or other display screen for watching by users. Accordingly, a user's experience of the content is typically confided to the TV and to speakers connected to the TV.

Some movie theaters are configured with special chairs that move or shake in concert with the action of the movie being displayed on the screen. Other movie theaters may drop pellets of water during rainy scenes of the movie. Such devices (i.e., the special chairs and water mechanism) are part of the movie theater. But, to date, efforts to extend a user's experience of content beyond the confides of the TV or display screen have been limited.

SUMMARY

Provided herein are system, apparatus, article of manufacture, method and/or computer program product embodiments, and/or combinations and sub-combinations thereof, for distributing content outside the confides of a television so as to enhance user experience of the content.

An example media device embodiment operates according to a method that includes receiving a data stream containing content and at least one non-TV experience trigger; causing the content to be played on the TV; and providing the non-TV experience trigger to at least one appropriate accessory device in a manner synchronous with playing the content on the TV, to thereby extend playback of the content beyond the TV.

A network may communicatively couple the media device to a plurality of accessory devices. In order to provide the non-TV experience trigger to the appropriate accessory device, the method includes analyzing at least the non-TV experience trigger to identify the appropriate accessory device from the plurality of accessory devices; and analyzing at least the non-TV experience trigger and the network to determine when to provide the non-TV experience trigger to the appropriate accessory device so that the appropriate accessory device executes the non-TV experience trigger synchronously with the playing of the content on the TV.

In order to analyze the non-TV experience trigger to identify the appropriate accessory device, the method includes identifying first accessory devices among the plurality of accessory devices that have capabilities supporting the non-TV experience trigger; and identifying second accessory devices among the first accessory devices that are located in or proximate to a media system containing the media device.

In some embodiments, the appropriate accessory device is separate and distinct from the media system containing the media device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for distributing content outside the confides of a television so as to enhance user experience of the content.

Figure 1:
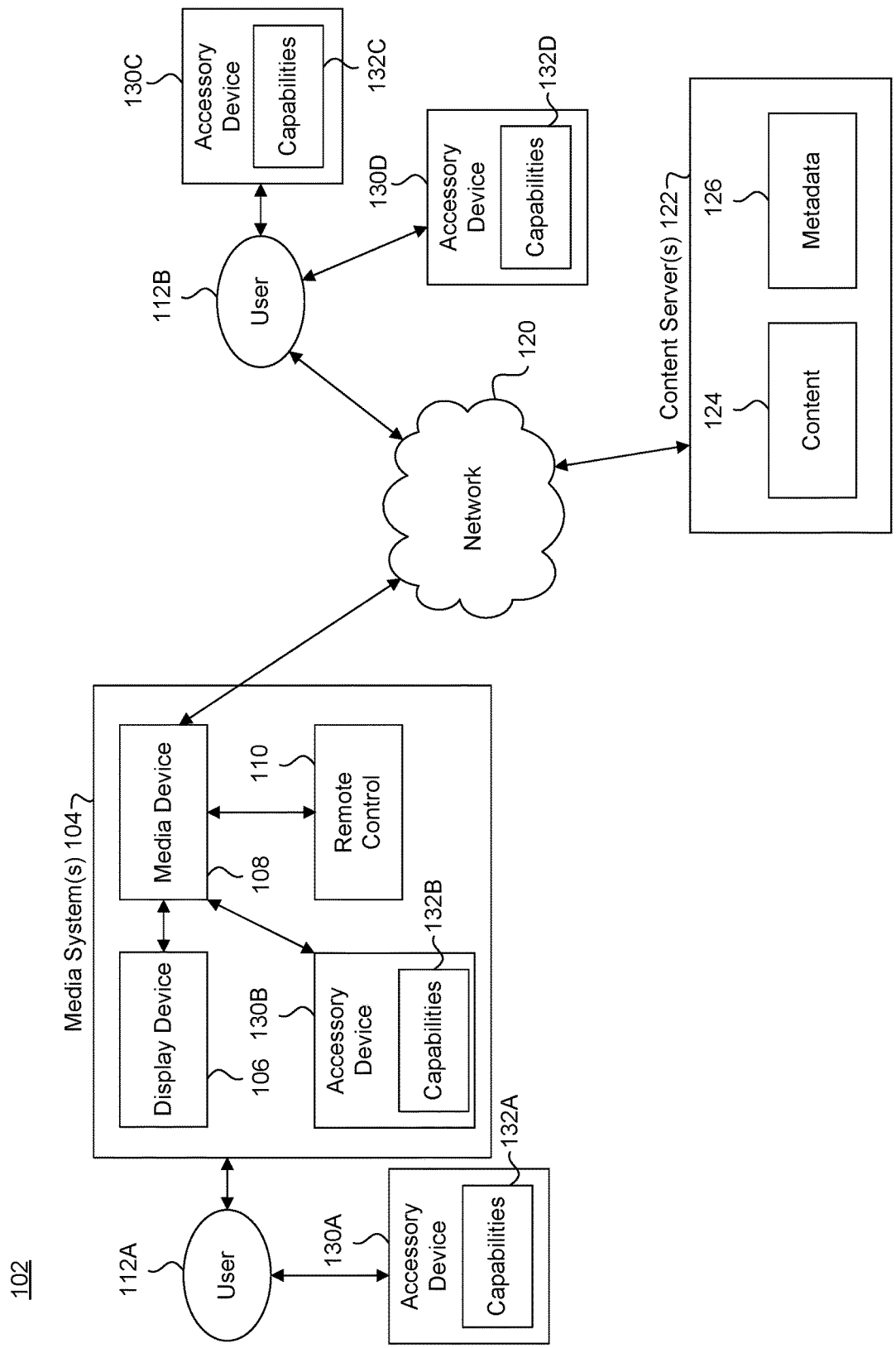
FIG. 1 illustrates a block diagram of a multimedia environment, according to some embodiments.

FIG. 1 illustrates a block diagram of a multimedia environment 102, according to some embodiments. In a non-limiting example, multimedia environment 102 is directed to streaming media. However, this disclosure is applicable to any type of media, as well as any mechanism, means, protocol, method and/or process for distributing media.

The multimedia environment 102 may include one or more media systems 104. Each media system 104 may include one or more media devices 108 each coupled to a display device 106. Media device 108 may be a streaming media device, DVD device, audio/video playback device, cable box, and/or digital video recording device, to name just a few examples. Display device 106 may be a monitor, television (TV), computer, smart phone, tablet, wearable (such as a watch), appliance, internet of things (IoT) device, and/or projector, to name just a few examples. In some embodiments, media device 108 can be a part of, integrated with, operatively coupled to, and/or connected to its respective display device 106.

Each media device 108 may be configured to communicate with network 120. In various embodiments, the network 120 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 108 and/or display device 106, such as a remote control, a tablet, laptop computer, smartphone, wearable, on-screen controls, integrated control buttons, audio controls, or any combination thereof, to name just a few examples. The remote control 110 may also be configured to control an accessory device 130B that is part of the media system 104, as further discussed below.

Media system 104 may include one or more accessory devices 130, each of which may be any electronic device that is used by, associated with, registered to and/or personal to users 112 operating in the multimedia environment 102. For example, accessory device 130A may be a smartphone owned by user 112A. Other examples of accessory devices 130 include tablets, wearables (such as a watch), appliances, internet of things (IoT) devices, notebook computers, to name just a few examples.

Some accessory devices 130 may be mobile and travel with their respective users 112, and/or may be considered separate and distinct from the media system 104, such as accessory device 130A that is associated with user 112A, and accessory devices 130C and 130D associated with user 112B. Examples of such mobile accessory devices 130A, 130C and 130D include smartphones, tablets, wearables, and notebook computers, to name just some examples.

Other accessory devices 130 may be stationary or fixed, and/or part of the media system 104, such as accessory device 130B in the media system 104. Accessory device 130B could be a coffee machine, refrigerator, automobile, audio responsive digital assistant (such as the AMAZON ECHO), and/or other appliance, internet of things (IoT) device, etc., to name just some examples.

Each accessory device 130 may have defined capabilities 132. For example, the capabilities 132 of a smartphone may include: sending and receiving texts, vibrating, outputting sounds, having a flashlight, and/or taking pictures or videos. The capabilities 132 of a coffee machine may include producing a cup of coffee pursuant to instructions and specifications that are electronically received from another electronic device. The capabilities 132 of an automobile may include starting and revving the engine or sounding the horn pursuant to commands that are electronically received from another electronic device. The capabilities 132 of accessory devices 130 associated with users 112 who have access to media device 108 may be published or otherwise distributed so they are known or accessible to the media device 108.

The multimedia environment 102 may include a plurality of content servers 122 (also called content providers 122). Although only one content server 122 is shown in FIG. 1, in practice the multimedia environment 102 may include any number of content servers 122. Each content server 122 may be configured to communicate with network 120.

Each content server 122 may store content 124 and metadata 126. Content 124 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 126 comprises data about content 124. For example, metadata 126 may include associated or ancillary information indicating or related to writer, director, producer, composer, artist, actor, summary, chapters, production, history, year, trailers, alternate versions, related content, applications, and/or any other information pertaining or relating to the content 124. Metadata 126 may also or alternatively include links to any such information pertaining or relating to the content 124. Metadata 126 may also or alternatively include one or more indexes of content 124, such as but not limited to a trick mode index. Metadata 126 may also include non-television experience triggers, as further described below.

Figure 2:
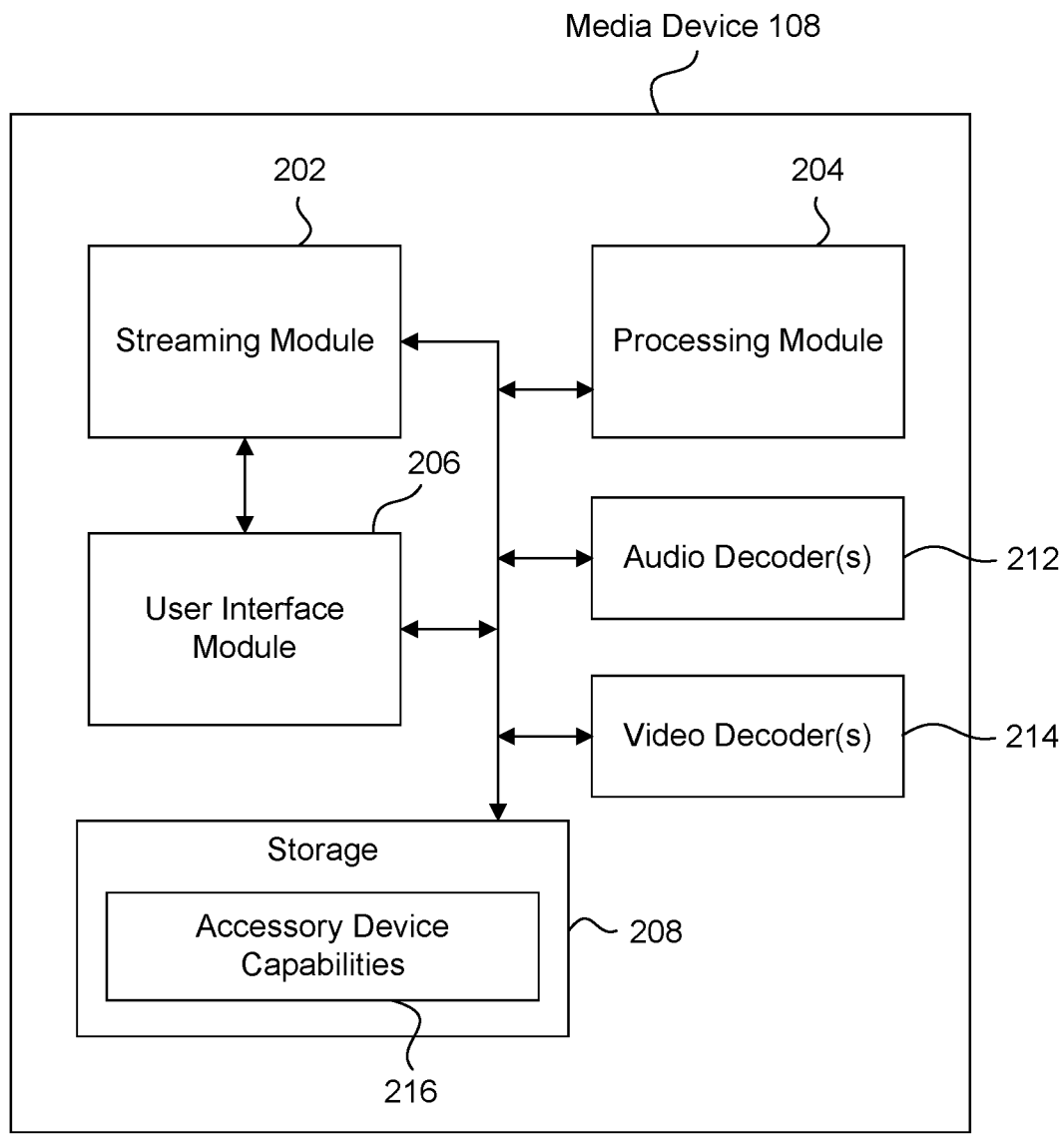
FIG. 2 illustrates a block diagram of a media device, according to some embodiments.

FIG. 2 illustrates a block diagram of an example media device 108, according to some embodiments. Media device 108 may include a streaming module 202, processing module 204, user interface module 206 and storage 208. The storage 208 may store accessory device capabilities 216. The accessory device capabilities 216 identify the respective capabilities 132 of each of the accessory devices 130 associated with users 112 who have access to the media device 108, and/or that have registered with media device 108. As noted above, such capabilities 132 may have been published by the accessory devices 130 or otherwise distributed or provided to media device 108, and then stored in the storage 208. Alternatively, the media device 108 may access the capabilities 132 on an as-needed basis via other means, such as from servers or other on-line resources (not shown) accessible via the network 120.

The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP 1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO DVCProHD, IMX, XDCAM HD, XDCAM HD422, and/or XDCAM EX, to name just some examples.

Now referring to both FIGS. 1 and 2, in some embodiments, the user 112A may interact with the media device 108 via, for example, the remote control 110. For example, the user 112A may use the remote control 110 to interact with the user interface module 206 of the media device 108 to select content, such as a movie, TV show, music, book, application, game, etc. The streaming module 202 of media device 108 may request the selected content from the content server 122 over the network 120. The content server 122 may transmit the requested content to the streaming module 202. Media device 108 may transmit the received content to the display device 106 for presentation to the user 112A. In streaming embodiments, the streaming module 202 may transmit the content to display device 106 in real time or near real time as it receives such content from the content server 122. In non-streaming embodiments, the media device 108 may store the content received from content server 122 in storage 208 for later playback on display device 106.

As just described, presentation of the content to the user 112A is limited to the display device 106. In some embodiments, however, such presentation of the content is extended beyond the display device 106. For example, such presentation may be extended to one or more accessory devices 130 in media system 104 and/or associated with the user 112A and/or other users 112 having access to or who use the media device 108. In this way, technical components of such embodiments (such as the electronic elements in the multimedia environment 102) are better integrated, and their use improved, so as to enhance the experience of users 112 as to the content.

Non-limiting examples of the foregoing include:
- When watching a movie or TV show where the characters are exchanging texts that are not shown on the display device 106, the texts can be sent to the user 112A's accessory device 130A (which may be a tablet or smartphone, for example).
- When watching a scary movie where a cat jumps out of nowhere, the accessory device 130A (which again may be a smartphone) can be commanded to vibrate and/or play a designated sound.
- When watching a movie with a fast car scene, the user 112A's car (that may be in the garage) may be controlled to turn on and rev the engine.
- When watching a movie scene where the characters are drinking coffee, an accessory device 130B in the media system 104 (which may be a coffee machine) can be commanded to brew a cup of coffee to match what the characters are drinking.
- When watching a horror movie where the bad guy is filling a glass with water to force the good guy to take poison, an accessory device 130B in the media system 104 (such as a smart refrigerator) can be commanded to pour water into a glass in sync with the pouring of water in the movie.
- When watching a movie where a character is commanding a digital assistant to perform some action, the accessory device 130B (which may be a digital assistant such as AMAZON ECHO) can be commanded to perform the character's command.
- When watching a movie where the character is calling his spouse to pick up milk on the way home from work, a text to pick up milk can be sent to an accessory device 130C (which may be a smartphone or wearable such as a smartwatch) associated with the spouse (that is, user 112B) of the user 112A who is watching the movie.

In some embodiments, extending the content to accessory devices 130 is achieved through use of non-TV experience triggers. A non-TV experience trigger is a message or other data object that causes an accessory device 130 (which is not a TV) to take an action. Non-TV experience trigger are also sometimes called triggers herein.

Figure 3:
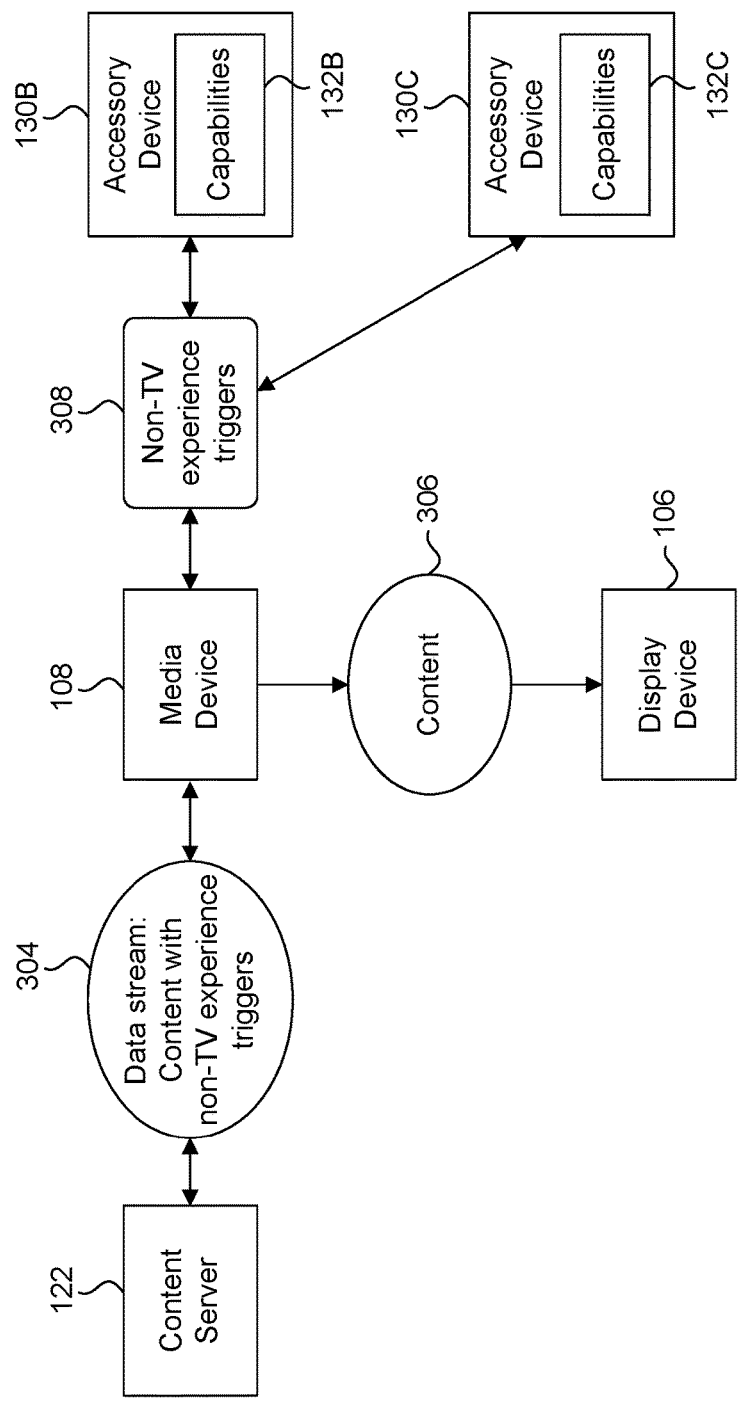
FIG. 3 is an operational data flow diagram of distributing content outside the confides of a television so as to enhance user experience of the content, according to some embodiments.

FIG. 3 illustrates an operational data flow diagram for distributing content outside the confides of a television so as to enhance user experience of the content, according to some embodiments. In the example of FIG. 3, the content server 122 may send a data stream 304 to the media device 108. The data stream 304 may include both content 306 (that may have been previously requested by the user 112A using the remote control 110 to control the media device 108, for example) and non-TV experience triggers 308.

Figure 4:
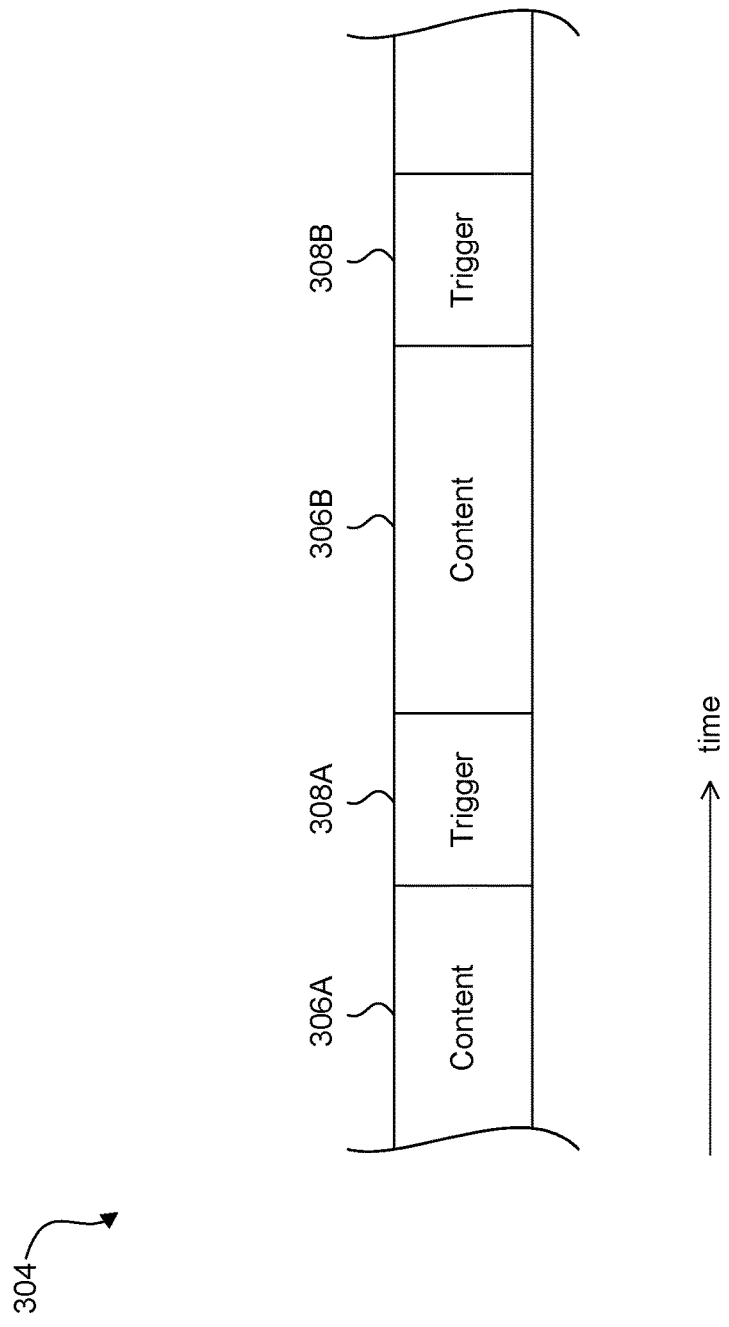
FIGS. 4 and 5 illustrate example forms for distributing content and non-television viewing triggers, according to some embodiments.
Figure 5:
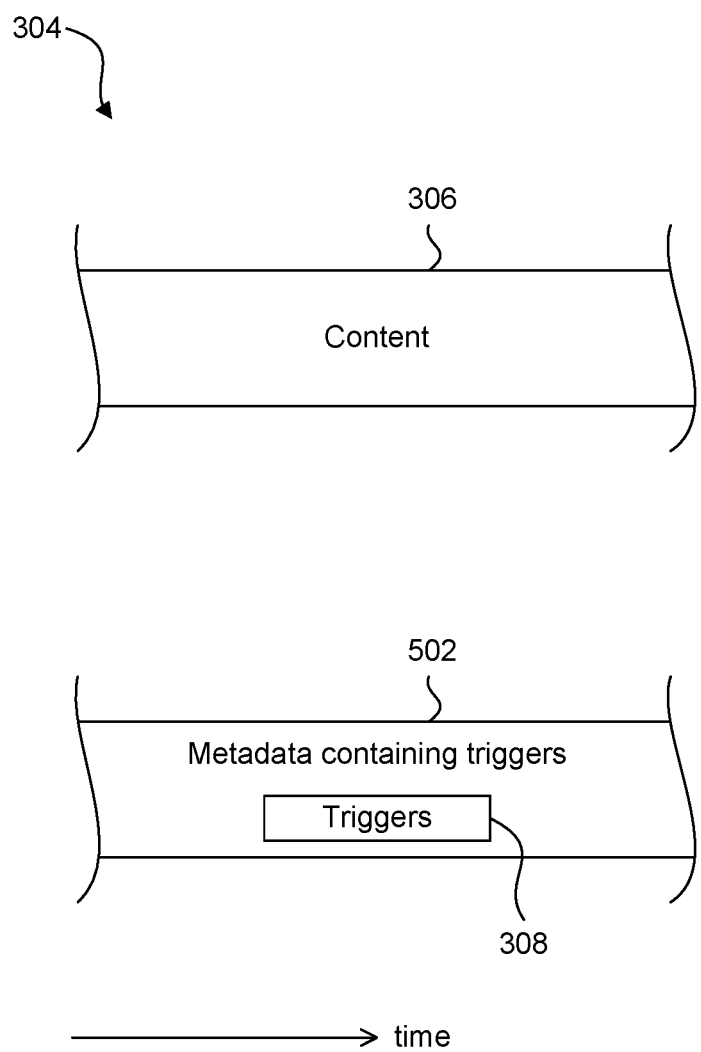

The data stream 304 may take various forms. For example, in FIG. 4, the content 304 is shown as a single stream of data, with triggers 308 intermixed in the content 306. In contrast, in FIG. 5, the content 306 is shown as a separate stream from metadata 502 that contains triggers 308. This disclosure is not limited to the examples shown in FIGS. 4 and 5.

The media device 108 may operate to extract the content 306 and the triggers 308 from the data stream 304. The media device 108 may transmit the content 306 to the display device 106 for playback to the user 112A. Also, the media device 108 may transmit the triggers 308 to appropriate accessory devices 130.

In some embodiments, such transmission of the triggers 308 is synced with the play of the content on the display device 106. For example, in the above scenario where the bad guy is filling a glass with water to force the good guy to take poison, the media device 108 may transmit the trigger 308 to the refrigerator (such as, for example, the accessory device 130B) such that the pouring of the water by the refrigerator is performed at the same time as the pouring of water in the movie being played on the display device 106. In doing so, the media device 108 may take into consideration the time it will take for the trigger message 308 to be transmitted to the accessory device 130B, and for the accessory device 130B to perform the designated action.

For example, the media device 108 may analyze the network 120 and/or the local wireless network (not explicitly shown in FIGS. 1 and 3) that wirelessly connects components of the media system 104. To perform this function, the media device 108 may use any well-known techniques, algorithms, services, tools, modules and/or approaches for evaluating the state and condition of a network or other communication medium, and may take into consideration factors such as bandwidth, traffic, congestion, collisions, latency, utilization, signal strength, the number of devices on a given channel, etc.

For example, the media device 108 may monitor network traffic for the presence or absence of acknowledgements (ACKS). As will be appreciated by persons skilled in the relevant art(s), the presence or absence of such ACKS can be analyzed by the media device 108 to at least partially determine and characterize the network 120 and/or the local wireless network.

Also or alternatively, the media device 108 may take into consideration the potential impact on the network 120 and/or the local wireless network of downloading various video encodings having different resolutions of the same content, such as 4K versus 1080p versus 720p, etc. As will be appreciated by persons skilled in the relevant art(s), downloading higher definition encodings is more likely to cause transmission delays relative to downloading lower definition encodings.

Figure 6:
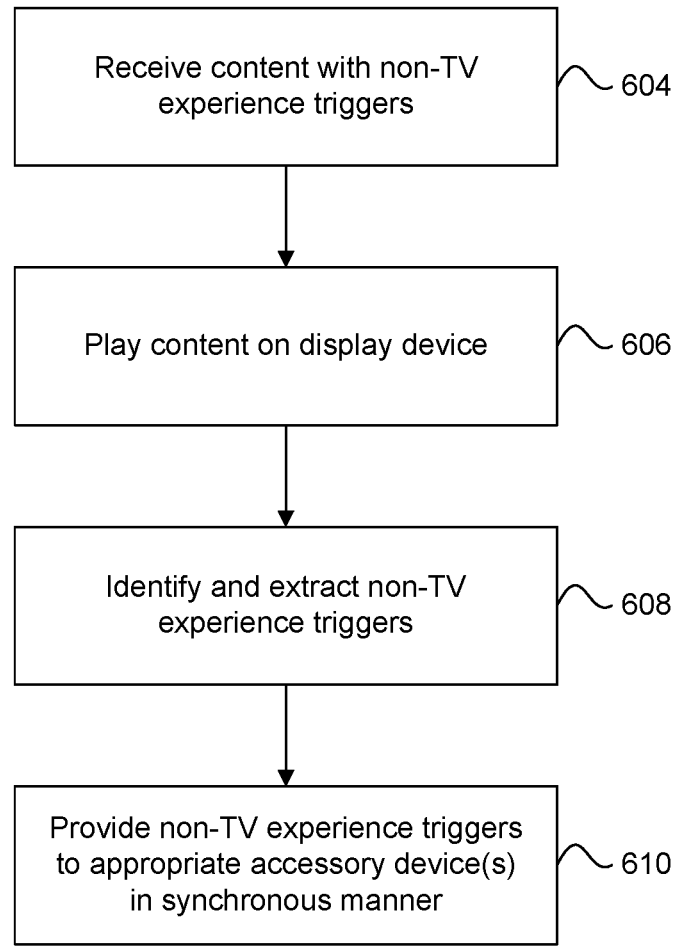
FIG. 6 is a flowchart for distributing content outside the confides of a television so as to enhance user experience of the content, according to some embodiments.

FIG. 6 illustrates a method 602 for distributing content outside the confides of a television so as to enhance user experience of the content, according to some embodiments. Method 602 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 602 shall be described with reference to FIGS. 1 and 3. However, method 602 is not limited to those example embodiments.

In 604, content and non-TV experience triggers may be received. For example, the media device 108 may receive a data stream 304 containing content 306 and non-TV experience triggers 306. The user 112A may have previously requested the content 306 (such as a movie or TV show) by using the remote control 110 to control the media device 108. The media device 108 may have requested and, in 604, may be receiving the data stream 304 from a content server 122.

In 606, the content may be played on a display device. For example, the media device 108 may extract the content 306 from the data stream 304. The media device 108 may play the extracted content 306 on the display device 106.

In 608, non-TV experience triggers may be identified and extracted from the data stream. For example, the media device 108 may identify and extract the triggers 308 from the data stream 304.

In 610, the non-TV experience triggers 308 may be provided to appropriate accessory devices 130 in a manner that is synchronous with playing the content 306 on the display device 106. For example, the media device 104 may analyze each trigger 308 to determine, among other things, (1) the requirements of the trigger 308, to ensure the trigger 308 is provided to and executed by accessory device(s) 130 that have capabilities 132 that are consistent with and that support the trigger 308's requirements (an accessory 130 that has such capabilities 132 is herein called an appropriate accessory device 130); and (2) the timing of when the trigger 308 should be provided to an appropriate accessory device 130, such that the appropriate accessory device 130 performs the trigger 308 in synchronization with playback of the content 306 on the display device 106. Such information (that is, (1) and (2)) may be included as part of the trigger 308 or as part of metadata 126, or may be retrieved by media device 108 via network 120 from an on-line source or server.

A given trigger 308 may be sent to multiple appropriate accessory devices 130, depending on the requirements of the trigger 308. For example, a given trigger 308 may require accessory devices 130 that have a light (such as a flash light or any other light), to correspond to a movie scene where an alien space ship is descending towards Earth, and as it descends it flashes lights towards the ground. The trigger 308 may specify that it should be delivered to multiple appropriate accessory devices 130, if possible. The trigger 308 may also specify that the appropriate accessory devices 130 must be located in or proximate to the media system 104.

For this example, the media device 108 may analyze its database of accessory device capabilities 216 to identify accessory devices 130 that have a light. Then, the media device 108 may determine which of these identified accessory devices 130 are located in or proximate to the media system 104; this determination may be performed using any well known technology, approach, process, method, technique, component or system, such as GPS (global position system), WIFI or cellular location positioning, pinging, polling, etc.

The media device 108 may transmit the trigger 308 to the appropriate accessory devices 130 that are located in or proximate to the media system 104, in such a manner that the trigger 308 is performed by these appropriate accessory devices 130 in sync with the playback of the content 306 on the display device 106. As noted above, to perform this function, the media device 108 may analyze the network 120 and/or the local wireless network (not explicitly shown in FIGS. 1 and 3) that wirelessly connects components of the media system 104, to determine how long it will likely take for the trigger 308 to be transmitted to these appropriate accessory devices 130.

The media device 108 may include in such transmission of the trigger 308, timing information to inform the appropriate accessory devices 130 when to execute the trigger 308. Upon receiving the trigger 308 and based on information provided by the media device 108 (such as when to perform the trigger 308), the appropriate accessory devices 130 may perform the trigger 308 (that is, in the above example, the appropriate accessory devices 130 will turn on their lights).

Other triggers 308 may require that appropriate accessory devices 130 be located away from the media system 104, or be associated with specific users 112, and/or be a specific type of device. This is the case for the above milk example, where the trigger 308 may specify that the appropriate accessory device 130 must be a smartphone, tablet and/or smartwatch associated with the spouse of the user 112 A.

In this manner, embodiments of this disclosure access, utilize and control computing and communications technologies in the area of media devices and streaming media, to extent the experience of content beyond televisions. Accordingly, such embodiments represent an improvement in computer-related technology.

Example Computer System

Figure 7:
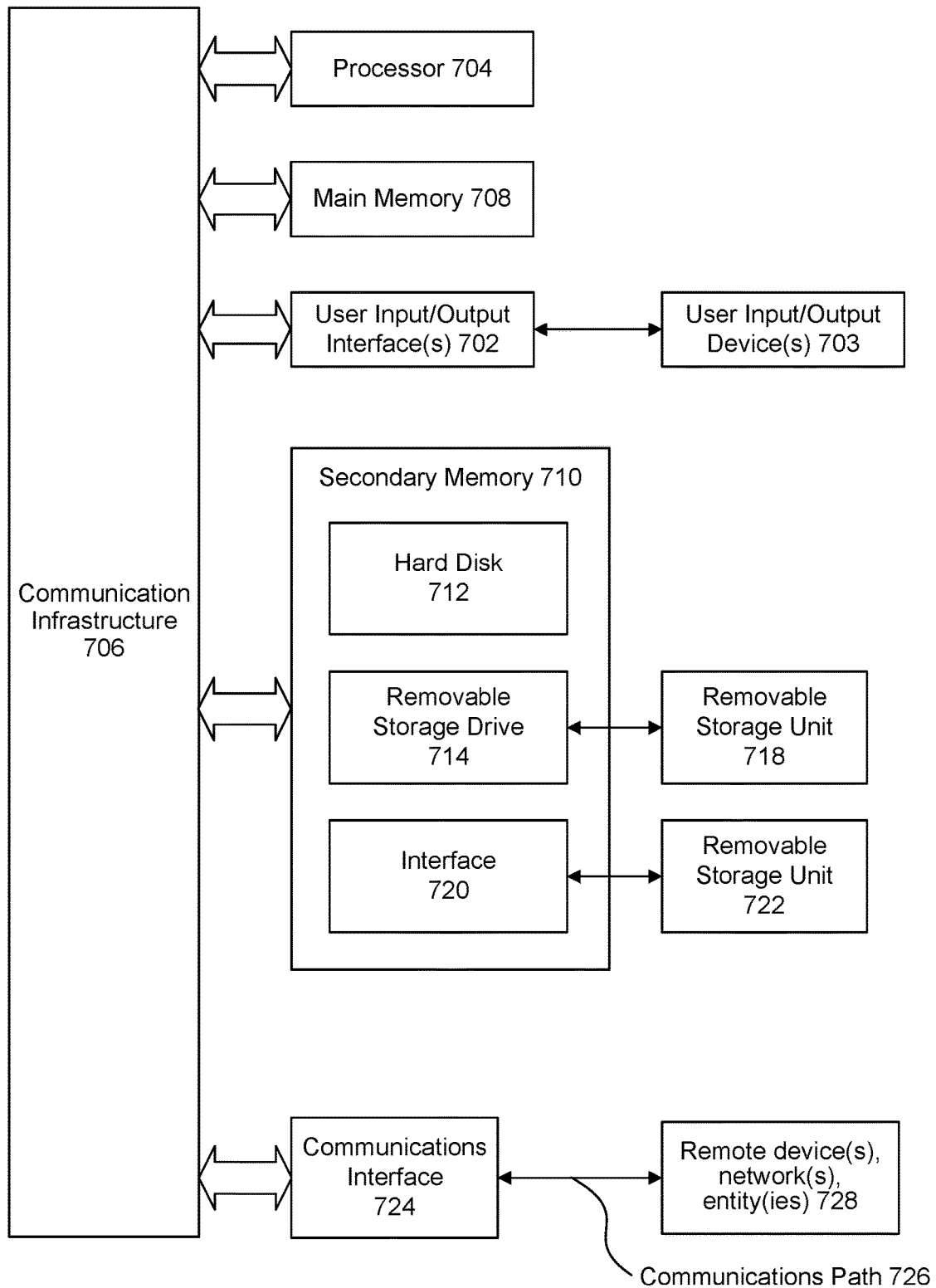
FIG. 7 illustrates an example computer system useful for implementing various embodiments.

Various embodiments and/or components therein can be implemented, for example, using one or more computer systems, such as computer system 700 shown in FIG. 7. Computer system 700 can be any computer or computing device capable of performing the functions described herein. For example, one or more computer systems 700 can be used to implement any embodiments of FIGS. 1-6, and/or any combination or sub-combination thereof.

Computer system 700 includes one or more processors (also called central processing units, or CPUs), such as a processor 704. Processor 704 is connected to a communication infrastructure or bus 706.

One or more processors 704 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 can include other means, instrumentalities or other approaches for allowing computer programs and/or other instructions and/or data to be accessed by computer system 700. Such means, instrumentalities or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A media device, comprising:
 a memory; and
 at least one processor communicatively coupled to the memory and configured to:
  receive a data stream containing content and at least one non-television (non-TV) experience trigger;
  cause the content to be played on a TV;
  identify at least one appropriate accessory device, wherein the TV and the media device are communicatively coupled to the at least one appropriate accessory device via a network;
  characterize the network based on presence or absence of acknowledgments in the network; and
  transmit the at least one non-TV experience trigger to the at least one appropriate accessory device via the network in a manner synchronous with playing the content on the TV based on (1) a length of time the network will take to deliver the at least one non-TV experience trigger to the at least one appropriate accessory device based on the characterization of the network and (2) a length of time that the at least one appropriate accessory device will take to execute the at least one non-TV experience trigger, to thereby extend playback of the content beyond the TV.

2. The media device of claim 1, wherein the at least one non-TV experience trigger specifies that the at least one appropriate accessory device is physically remote from the media device and the TV.

3. The media device of claim 1, wherein to identify the at least one appropriate accessory device, the at least one processor is configured to identify the at least one appropriate accessory device based on the at least one appropriate accessory device being physically remote from the media device and the TV as specified by the at least one non-TV experience trigger.

4. The media device of claim 1, wherein the at least one processor is further configured to monitor network traffic of the network for the presence or absence of acknowledgments in the network.

5. The media device of claim 1, wherein the at least one processor is further configured to determine the length of time the network will take to deliver the at least one non-TV experience trigger to the at least one appropriate accessory device via the network based on the characterization of the network.

6. The media device of claim 1, wherein the at least one non-TV experience trigger is included in metadata associated with the content, and the at least one processor is configured to receive the metadata with the data stream.

7. The media device of claim 1, wherein the network communicatively couples the media device with at least some of a plurality of accessory devices, and wherein to transmit the at least one non-TV experience trigger, the at least one processor is further configured to:
- identify first accessory devices among the plurality of accessory devices that have capabilities supporting the at least one non-TV experience trigger; and
- identify a second accessory device among the first accessory devices that are located in or proximate to a media system containing the media device.

8. The media device of claim 1, wherein the network communicatively couples the media device with at least some of a plurality of accessory devices, and wherein to transmit the at least one non-TV experience trigger, the at least one processor is further configured to:
- identify first accessory devices among the plurality of accessory devices that have capabilities supporting the at least one non-TV experience trigger; and
- identify a second accessory device among the first accessory devices that are located distant from a media system containing the media device or are associated with a specific user.

9. A method to be performed by a media device for extending playback of content beyond a television (TV), the method comprising:
- receiving a data stream containing content and at least one non-TV experience trigger;
- causing the content to be played on the TV;
- identifying at least one appropriate accessory device, wherein the TV and the media device are communicatively coupled to the at least one appropriate accessory device via a network;
- characterizing the network based on presence or absence of acknowledgments in the network; and
- transmitting the at least one non-TV experience trigger to the at least one appropriate accessory device via the network in a manner synchronous with playing the content on the TV based on (1) a length of time the network will take to deliver the at least one non-TV experience trigger to the at least one appropriate accessory device based on the characterization of the network and (2) a length of time that the at least one appropriate accessory device will take to execute the at least one non-TV experience trigger, to thereby extend the playback of the content beyond the TV.

10. The method of claim 9, wherein:
- the at least one non-TV experience trigger specifies that the at least one appropriate accessory device is physically remote from the media device and the TV, and
- identifying the at least one appropriate accessory device comprises identifying the at least one appropriate accessory device based on the at least one appropriate accessory device being physically remote from the media device and the TV as specified by the at least one non-TV experience trigger.

11. The method of claim 9, further comprising:
- monitoring network traffic of the network for the presence or absence of acknowledgments in the network; and
- determining the length of time the network will take to deliver the at least one non-TV experience trigger to the at least one appropriate accessory device via the network based on the characterization of the network.

12. The method of claim 9, wherein the at least one non-TV experience trigger is included in metadata associated with the content, and the method further comprises receiving the metadata with the data stream.

13. The method of claim 9, wherein the network communicatively couples the media device with at least some of a plurality of accessory devices, and wherein the transmitting the at least one non-TV experience trigger comprises:
- identifying first accessory devices among the plurality of accessory devices that have capabilities supporting the at least one non-TV experience trigger; and
- identifying a second accessory device among the first accessory devices that are located in or proximate to a media system containing the media device.

14. The method of claim 9, wherein the network communicatively couples the media device with at least some of a plurality of accessory devices, and wherein the transmitting the at least one non-TV experience trigger comprises:
- identifying first accessory devices among the plurality of accessory devices that have capabilities supporting the at least one non-TV experience trigger; and
- identifying a second accessory device among the first accessory devices that are located distant from a media system containing the media device or are associated with a specific user.

15. A non-transitory computer-readable medium having instructions stored thereon that, when executed by at least one computing device in a media device, cause the at least one computing device to perform operations to extend playback of content beyond a television (TV), the operations comprising:
- receiving a data stream containing content and at least one non-TV experience trigger;
- causing the content to be played on the TV;
- identifying at least one appropriate accessory device, wherein the TV and the media device are communicatively coupled to the at least one appropriate accessory device via a network;
- characterizing the network based on presence or absence of acknowledgments in the network; and
- transmitting the at least one non-TV experience trigger to the at least one appropriate accessory device via the network in a manner synchronous with playing the content on the TV based on (1) a length of time the network will take to deliver the at least one non-TV experience trigger to the at least one appropriate accessory device based on the characterization of the network and (2) a length of time that the at least one appropriate accessory device will take to execute the at least one non-TV experience trigger, to thereby extend the playback of the content beyond the TV.

16. The non-transitory computer-readable medium of claim 15, wherein:
- the at least one non-TV experience trigger specifies that the at least one appropriate accessory device is physically remote from the media device and the TV, and identifying the at least one appropriate accessory device comprises identifying the at least one appropriate accessory device based on the at least one appropriate accessory device being physically remote from the media device and the TV as specified by the at least one non-TV experience trigger.

17. The non-transitory computer-readable medium of claim 15, the operations further comprising:
monitoring network traffic of the network for the presence or absence of acknowledgments in the network; and
determining the length of time the network will take to deliver the at least one non-TV experience trigger to the at least one appropriate accessory device via the network based on the characterization of the network.

18. The non-transitory computer-readable medium of claim 15, wherein the at least one non-TV experience trigger is included in metadata associated with the content, and the operations further comprise receiving the metadata with the data stream.

19. The non-transitory computer-readable medium of claim 15, wherein the at least one appropriate accessory device is separate and distinct from a media system containing the media device.

20. The non-transitory computer-readable medium of claim 15, wherein the operations further comprising:
transmitting the content to the TV to be played on the TV as the media device receives the data stream; or
storing the content before causing the content to be played on the TV.

* * * * *